D. D. MYERS.
LAMP.
APPLICATION FILED APR. 21, 1913.
1,074,449. Patented Sept. 30, 1913.
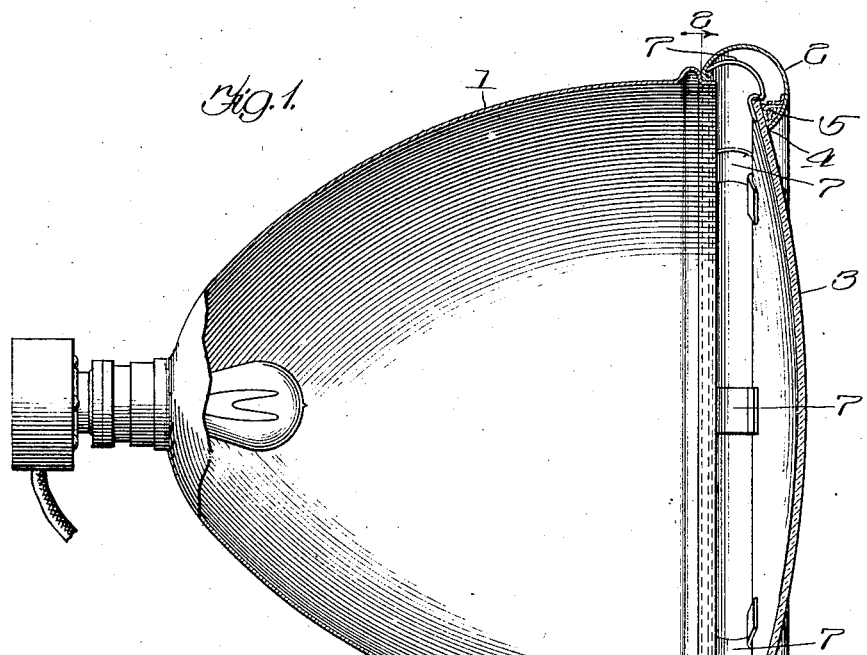
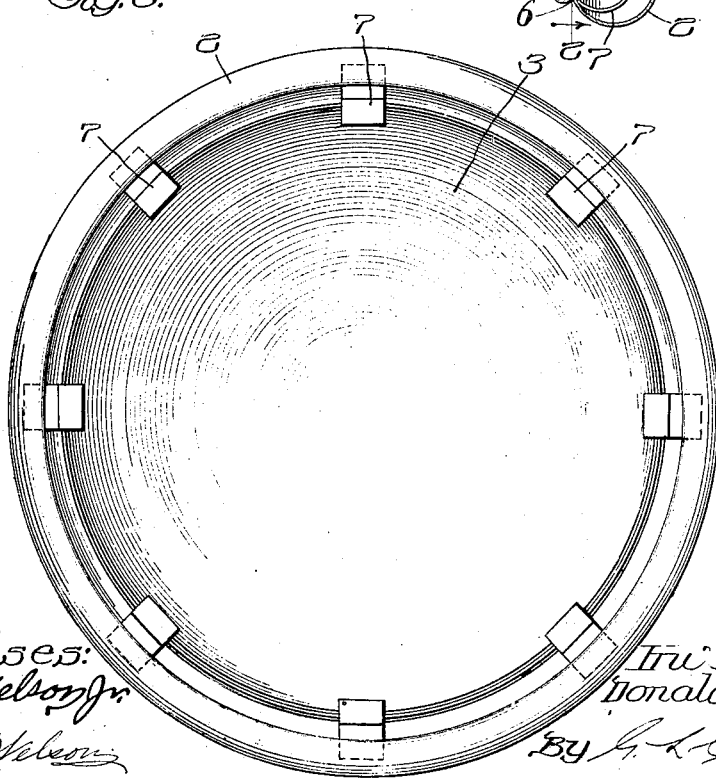
Witnesses:
Jno. H. Nelson Jr.
Edward B. Nelson
Inventor:
Donald D. Myers
By G. L. Graff
Atty.

UNITED STATES PATENT OFFICE.

DONALD D. MYERS, OF LA FAYETTE, INDIANA, ASSIGNOR TO THE ESTERLINE COMPANY, OF INDIANAPOLIS, INDIANA, A CORPORATION OF INDIANA.

LAMP.

1,074,449. Specification of Letters Patent. Patented Sept. 30, 1913.

Application filed April 21, 1913. Serial No. 762,499.

*To all whom it may concern:*

Be it known that I, DONALD D. MYERS, a citizen of the United States, residing at La Fayette, in the county of Tippecanoe and State of Indiana, have invented a certain new and useful Improvement in Lamps, of which the following is a full, clear, concise, and exact description, reference being had to the accompanying drawings, forming a part of this specification.

My invention relates to lamps and is of particular service in connection with that class of lamps employed upon vehicles, such as automobile head lights.

The invention has for its object the provision of improved means for holding the transparent or light piercing front wall of the lamp within its frame that is carried by the body of the lamp which incloses the light source.

In practising the invention the frame which carries the glass or other transparent front wall is mounted at its rear upon the lamp body and is extended forwardly of the glass so as to have the glass interposed between the front and rear margins of the frame. Fastening means are carried upon the frame and operate outwardly upon the rear surface of the glass to force the glass against the front margin or edge of the frame. The fastening means is preferably in the form of a number of spring clips each mounted at one end upon the frame and grooved to receive the rim of the glass at the other end, the resilience of the spring clips being sufficient to press the glass outwardly with the requisite pressure to afford proper engagement between the front face of the glass and the front rim of the frame which rim may include an annular packing to prevent passage of foreign matter between the glass and its frame. The invention, however, is not to be limited to the use of spring fastening means.

I will explain my invention more fully by reference to the accompanying drawing showing the preferred embodiment thereof and in which—

Figure 1 is an axial sectional view and Fig. 2 is a sectional view on line 2 2 of Fig. 1.

Like parts are indicated by similar characters of reference throughout the different figures.

The lamp body 1 incloses any suitable light source such as an incandescent electric lamp. A frame 2 is supported at the forward portion of the housing in any suitable manner. This frame supports a front transparent or light piercing wall 3 preferably made of glass. The frame is desirably of ring shape and is made hollow by being formed of inwardly curled sheet metal, the front annular margin 4 of the frame being inset and engaging the front face of the glass cover 3 adjacent the periphery of such cover, spacing intervening between said annular margin and periphery for engagement with packing 5 carried by the frame and which packing serves to prevent the passage of dust to the interior of the body 1. Clips 7 which are made of strip spring metal are separably engaged at their inner ends with the rear annular margin 6 of the frame 2, being desirably merely tucked between such margin and the glass front. These clips are pocketed at their outer ends to receive the peripheral portion of the cover 3. The pressure is exerted outwardly so that the clips press the glass cover 3 against the annular edge 4 and the annular packing 5 which surrounds the edge portion 4.

Having thus described my invention I claim as new and desire to secure by Letters Patent the following:

A lamp structure including a lamp body for inclosing a light source; a frame formed of inwardly curled sheet material carried at the front end of the body and having front and rear margins; a wall which permits of the passage of light engaging at its outer surface with the front margin of the frame and being disposed forwardly of the rear margin; and clips formed of strip spring metal whose rear ends engage the frame at its rear margin and whose forward ends are pocketed and there receive the periphery of the cover.

In witness whereof, I hereunto subscribe my name this 16th day of April A. D., 1913.

DONALD D. MYERS.

Witnesses:
G. L. CRAGG,
ETTA L. WHITE.